Patented Jan. 1, 1935

1,986,366

UNITED STATES PATENT OFFICE 1,986,366

MANUFACTURE OF VISCOSE PRODUCTS

Milton O. Schur, Berlin, N. H., assignor to Brown Company, Berlin, N. H., a corporation of Maine No Drawing. Application April 11, 1931, Serial No. 529,550

16 Claims. (Cl. 106—40)

This invention relates to viscose products, being inclusive of both a special viscose syrup constituting a step product, and certain ultimate products, especially papers, made therewith.

When viscose is incorporated into certain articles, for instance into sheet material such as papers and fabrics, and then set therein, evil odors generally emanate from such articles, particularly when they are stored or shipped in bulk and/or in closed packages or containers through which there is little or no circulation of air. These malodors arise from sulphur compounds, probably of the nature of sulphides, generated as decomposition products of the viscose. They are especially disagreeable in the case of paper toweling treated with viscose, even though such toweling has been found to have substantially unimpaired water absorbency and phenomenally high wet strength when as little as 1% viscose in terms of soluble cellulose based on the weight of dry fiber has been uniformly distributed throughout the toweling.

In accordance with the present invention, I add to the viscose a compound which reacts with the sulphur impurities present in the viscose to produce a volatile sulphur compound. Preferably, the compound is also one whose positive radical, too, is liberated as a volatile compound, thus leaving the negative radical in combination with the alkali content of the viscose. As a final property, it is desirable that the added compound itself be volatilizable under elevated temperatures such as may be used in drying papers, fabrics, or other articles with which the viscose is associated. Ammonium salts, or chemical equivalents such as the amine salts, answer the first two properties desired, but, rather than using salt such as ammonium chloride or ammonium sulphate, I prefer to use ammonium carbonate and/or ammonium carbamate, not only because such latter salts are decomposed and volatilized readily under moderate heat far below that which causes a scorching or caramelizing of cellulose, but further because the viscose treated therewith ripens more slowly than viscose treated with the chloride or sulphate. This latter factor is one of importance in actual plant operation, since viscose tends to ripen and gel even with treatment at ordinary room temperatures. It is further to be remarked that the preferred salts, such as ammonium carbonate and/or carbamate, are readily decomposed and volatilized at temperatures below 100° C. and so are expelled from the viscose-treated paper when it is run over the usual steam-heated drying drums, as hereinafter described, whereas such salts as ammonium chloride and ammonium sulphate require much higher temperatures for volatilization than those to which the drying drums are heated and hence any excess or residuum would remain in the paper.

Viscose modified in accordance with my invention may be incorporated into paper such as is intended for paper toweling at any suitable stage of paper manufacture, for instance in the beater, between the beater and the paper machine, and on the wet end of the paper machine (i. e., before drying). Or it may be applied to a dried waterleaf paper, whereupon the paper may be redried. The sulphur compounds or sulphides present as impurities in the viscose react with the ammonium salt added to the viscose to form ammonium sulphide, which hydrolyzes into ammonia and hydrogen sulphide. Both the ammonia and the hydrogen sulphide are volatile or gaseous, so that when the viscose is aerated and/or heated as on the paper machine driers, the ammonia and hydrogen sulphide are removed from the viscose-containing paper.

As a specific example of procedure falling within the purview of the present invention, I may cite the following. Water is delivered into a mixing tank and is preferably brought to, say, 75° F. An ammonium salt, preferably ammonium carbonate, in amount calculated to give about a 1% solution, is added to the water and dissolved therein. The viscose syrup in suitable concentration is now added to the aqueous solution to produce a dilute viscose solution, for instance one of ¾% strength in terms of soluble cellulose. The solution is then aerated as by delivering air through perforated pipes emitting into the solution at the bottom of the tank, or by passing the solution through a properly designed aerating tower. Usually, an aerating period of about 1 to 1¼ hours in the tank renders the solution ready for use, since at the end of this time relatively little gas is expelled, even though large volumes of ammonia and hydrogen sulphide are driven off at the beginning of the aerating operation, and, if desired, may be recovered. It is preferred to aerate the solution at a temperature of about 75° F., as at such temperature the volatile gases are expelled much more quickly than at lower temperatures, say, 45° F. It is not desirable, however, to maintain the solution at a temperature much higher than 75° F., because at such higher temperature the ripening of the solution takes place at so rapid a rate that under the normal operating conditions in a mill, the solution may actually gel before a batch of prepared solution is entirely consumed. During aeration, a suitable acid, that is, a weakly ionized acid, such as boric, may to advantage be gradually added to the solution to neutralize free alkali present therein. The amount of boric acid based on solution used may be 1%, more or less, depending upon the alkali content of the viscose used as a raw material. The ammonium salt also assists in neutralizing free alkali in the solution. Thus, ammonium carbonate will react with the caustic soda in the solution to produce ammonium hydroxide (volatile and a volatilizing agent for the sulphide impurities) and sodium carbonate, which latter compound is comparatively neutral and harmless in paper toweling and, as a matter of fact, is water-soluble and may be removed by a washing step.

The viscose solution may be incorporated into paper toweling, as already indicated. During the drying or redrying of the toweling under heat, excess or residual ammonium carbonate is volatilized and expelled from the paper. If the temperature during drying is moderate, sodium bicarbonate may be formed through the interaction of the sodium carbonate content of the toweling with carbon dioxide generated therewithin, as a result of decomposition of residual ammonium carbonate. This leaves the toweling in more nearly neutral condition, since sodium bicarbonate is practically neutral, whereas sodium carbonate has a slightly alkaline reaction in water.

The specific example hereinbefore given may, of course, be departed from in respect of the strength of the viscose solution produced, the quantity of ammonium salt and acid added thereto, the temperature of treatment, etc., although a dilute solution such as described is effective in penetrating already-formed, waterleaf paper toweling to impart high wet strength thereto without materially detracting from the water absorptivity of the toweling.

I claim:

1. A step which comprises adding to a viscose solution an ammonium compound which can be volatilized at below 100° C. and which reacts upon the viscose to produce a volatile sulphur compound, said addition being effected while maintaining said viscose solution in an ungelled state.

2. A step which comprises adding to a viscose solution an ammonium compound which can be volatilized at below 100° C. and which reacts upon the viscose to produce a volatile sulphur compound, and whose positive radical is also liberated as a volatile compound, said addition being effected while maintaining said viscose solution in an ungelled state.

3. A step which comprises adding an ammonium salt volatilizable at below 100° C. to a viscose solution while maintaining said solution in an ungelled state.

4. A step which comprises adding ammonium carbonate to a viscose solution while maintaining said solution in an ungelled state.

5. A step which comprises adding an ammonium salt and boric acid to a viscose solution containing free alkali while maintaining said solution in an ungelled state.

6. Steps which comprise adding an ammonium salt to a viscose solution containing free alkali, aerating the solution, and gradually adding boric acid to neutralize free alkali during aeration.

7. In the manufacture of paper with viscose as an ingredient, those steps which comprise initially treating the viscose with ammonium carbonate, incorporating the treated viscose into the paper at any stage in its manufacture, and drying the paper at temperatures to expel hydrogen sulphide and ammonia generated in the viscose, as well as residual ammonium carbonate.

8. Steps which comprise adding ammonium carbonate to a viscose solution, and aerating the solution.

9. In the manufacture of paper with viscose as an ingredient, those steps which comprise initially treating the viscose with an ammonium salt volatilizable at below 100° C., incorporating the treated viscose into paper at any stage in its manufacture, and drying the viscose-containing paper at a sufficiently elevated temperature to volatilize residual ammonium salt in said paper.

10. An ungelled, aerated, viscose solution containing an ammonium salt volatilizable at below 100° C.

11. An ungelled, aerated, viscose solution containing ammonium carbonate.

12. An ungelled, viscose solution containing an ammonium salt and whose free alkali content has been largely neutralized with boric acid.

13. An ungelled, aerated, viscose solution containing an ammonium salt and whose free alkali content has been largely neutralized with boric acid.

14. An ungelled, viscose solution containing ammonium carbonate and whose free alkali content has been largely neutralized with boric acid.

15. An ungelled, aerated, viscose solution containing ammonium carbonate and whose free alkali content has been largely neutralized with boric acid.

16. An ungelled viscose solution containing an ammonium salt volatilizable at below 100° C.

MILTON O. SCHUR.